(12) United States Patent
Kobayashi et al.

(10) Patent No.: US 9,050,895 B2
(45) Date of Patent: Jun. 9, 2015

(54) CONTROL APPARATUS OF ROTATING ELECTRICAL MACHINE

(75) Inventors: Hiroyuki Kobayashi, Kobe (JP); Yasufumi Ogawa, Chiyoda-ku (JP); Keiichi Enoki, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 268 days.

(21) Appl. No.: 13/600,665

(22) Filed: Aug. 31, 2012

(65) Prior Publication Data

US 2013/0278195 A1     Oct. 24, 2013

(30) Foreign Application Priority Data

Apr. 23, 2012   (JP) .................................. 2012-097312

(51) Int. Cl.
| | | |
|---|---|---|
| *H02K 29/08* | (2006.01) | |
| *B60L 7/16* | (2006.01) | |
| *H02P 6/08* | (2006.01) | |
| *H02P 6/16* | (2006.01) | |

(52) U.S. Cl.
CPC . *B60L 7/16* (2013.01); *H02P 6/085* (2013.01); *H02P 6/16* (2013.01); *B60L 2220/46* (2013.01); *Y02T 10/642* (2013.01)

(58) Field of Classification Search
USPC ............... 318/400.35, 400.38, 704, 773, 718, 318/400.04, 683; 324/76.77, 76.52, 207.2
See application file for complete search history.

(56) References Cited

U.S. PATENT DOCUMENTS

| | | | |
|---|---|---|---|
| 5,920,161 A * | 7/1999 | Obara et al. .................. | 318/139 |
| 6,750,626 B2 | 6/2004 | Degner et al. | |
| 6,806,670 B2 | 10/2004 | Kusaka | |
| 6,984,954 B2 | 1/2006 | Leonardi et al. | |
| 7,423,396 B2 | 9/2008 | Bolt | |
| 2003/0210006 A1* | 11/2003 | Kusaka ......................... | 318/437 |
| 2004/0046519 A1 | 3/2004 | Leonardi et al. | |
| 2004/0189223 A1 | 9/2004 | Leonardi et al. | |
| 2005/0275361 A1 | 12/2005 | Bolt | |
| 2006/0125439 A1* | 6/2006 | Ajima et al. .................. | 318/716 |
| 2008/0265809 A1* | 10/2008 | Ol et al. ........................ | 318/139 |
| 2010/0052581 A1* | 3/2010 | Izumi et al. .............. | 318/400.04 |
| 2012/0181962 A1 | 7/2012 | Scheit et al. | |

FOREIGN PATENT DOCUMENTS

| | | |
|---|---|---|
| DE | 19725136 A1 | 12/1998 |
| DE | 19747410 A1 | 4/1999 |
| DE | 10320126 A1 | 12/2003 |

(Continued)

OTHER PUBLICATIONS

Japanese Office Action, issued Jan. 7, 2014, Application No. 2012-097312.

(Continued)

*Primary Examiner* — Kawing Chan
*Assistant Examiner* — Jorge L Carrasquillo
(74) *Attorney, Agent, or Firm* — Sughrue Mion, PLLC; Richard C. Turner

(57) ABSTRACT

A phase difference between an inductive voltage of an armature winding of a rotating electrical machine and an output of a magnetic pole position sensor is detected by a phase difference detection unit. The output of the magnetic pole position sensor is corrected on the basis of the phase difference thus detected and a power conversion unit is controlled on the basis of the corrected output.

7 Claims, 8 Drawing Sheets

(56) References Cited

FOREIGN PATENT DOCUMENTS

| | | |
|---|---|---|
| DE | 10338211 A1 | 4/2004 |
| DE | 102005027775 A1 | 4/2006 |
| DE | 102009045247 A1 | 4/2011 |
| JP | 09-047066 A | 2/1997 |
| JP | 2001211698 A * | 8/2001 |
| JP | 2003-333884 A | 11/2003 |
| JP | 2007-318894 A | 12/2007 |
| JP | 2008-236959 A | 10/2008 |
| JP | 2008-312387 A | 12/2008 |
| JP | 2008312387 A * | 12/2008 |
| JP | 2010-057228 A | 3/2010 |

OTHER PUBLICATIONS

Japanese Office Action, issued Sep. 10, 2013, Patent Application No. 2012-097312.
German Office Action, Patent Application No. 102012215042.0, issued Nov. 8, 2012.
Communication dated Jan. 23, 2015, issued by the State Intellectual Property Office of P.R. China in counterpart Chinese application No. 201210356844.0.

* cited by examiner

A CASE WITH PHASE DIFFERENCE AT MAGNETIC POLE POSITION SENSOR ($\theta$ e[deg])

$Cvd = \alpha$ [V]
$Cvq = \omega\phi - \beta$ [V]

A CASE WITHOUT PHASE DIFFERENCE AT MAGNETIC POLE POSITION SENSOR (0[deg])

$Cvd = 0$ [V]
$Cvq = \omega\phi$ [V]

CONTROL APPARATUS OF ROTATING ELECTRICAL MACHINE

BACKGROUND OF THE INVENTION

1. Field of the Invention

The present invention relates to a control apparatus of a rotating electrical machine, such as an in-vehicle motor generator installed to a vehicle.

2. Background Art

Generally, a synchronous machine, such as a motor generator installed to a vehicle, is controlled by controlling a current flown to an armature winding of the synchronous machine on the basis of a position of a magnetic pole of a rotor detected by a magnetic pole position sensor, such as a synchro resolver. However, the synchronous machine has a problem that a desired torque cannot be obtained when there is displacement between a detection value of a position of the magnetic pole and an actual position of the magnetic pole due to an attachment error or misalignment of the magnetic pole position sensor.

To solve this problem, a control apparatus of a synchronous machine in the related art disclosed, for example, in Patent Document 1, is configured as follows. That is, inertia of a system and a load torque are preliminarily examined, and when a load torque of a synchronous machine is sufficiently small, a d-axis current and a q-axis current with which a torque of the synchronous machine becomes 0 are provided to an armature winding. On the basis of a variance of a rotating speed, a load torque, and inertia of the system at this point, an amount of displacement between a position of the magnetic pole detected by the magnetic pole position sensor and an actual position of the magnetic pole is found. According to the amount of displacement thus found, the detection position of the magnetic pole detected by the magnetic pole position sensor is corrected.

Also, a control apparatus of a synchronous machine in the related art disclosed in Patent Document 2 is configured as follows. That is, a permanent-magnet synchronous machine is driven by an inverter and a switching unit is provided between the inverter and the synchronous machine. The switching unit is opened after power is supplied to detect an inductive voltage waveform of the synchronous machine. The inductive voltage waveform thus detected is compared with an output signal of a magnetic pole position sensor that measures a rotating angle of the synchronous machine. An output error of the magnetic pole position sensor is found on the basis of a phase difference between the inductive voltage waveform and the output signal. An output signal of the magnetic pole position sensor is corrected according to the error thus found.

Patent Document 1: JP-A-2007-318894
Patent Document 2: JP-A-9-47066

In the case of the control apparatus of a synchronous machine in the related art disclosed in Patent Document 1, a load torque of the synchronous machine is used for the control. Hence, it is necessary to know a load torque of the synchronous machine that varies with a running condition of the vehicle by measuring the load torque in advance. Also, in a case where it is difficult to know an exact torque because the load torque varies, detection accuracy of an amount of displacement described above is deteriorated. Further, with the control apparatus of a synchronous machine in the related art disclosed in Patent Document 1, in a case where a position of the magnetic pole is detected in a region where a torque of the synchronous machine is small, influences of the load torque on a torque of the synchronous machine becomes considerable and detection accuracy of an amount of displacement described above is deteriorated in some cases due to a variation of the load torque.

Also, with the control apparatus of a synchronous machine in the related art disclosed in Patent Document 2, in order to detect a phase difference at the magnetic pole position sensor, it is necessary to provide a mode to measure an inductive voltage of the synchronous machine by opening the switching unit.

SUMMARY OF THE INVENTION

The invention is devised to solve the problems with the control apparatus of a rotating electrical machine, such as a synchronous machine, in the related art as described above, and has an object to provide a control apparatus of a rotating electrical machine capable of controlling a rotating electrical machine with accuracy even when applied to a rotating electrical machine installed to a vehicle in which load varies without having to preliminarily acquire information on a load torque of the rotating electrical machine and inertia of a system.

A control apparatus of a rotating electrical machine according to a first aspect of the invention controls a rotating electrical machine configured so as to drive a drive wheel of a vehicle or to be driven by the drive wheel, and includes: a power conversion unit that performs power conversion between an outside DC power supply and an armature winding of the rotating electrical machine; a magnetic pole position sensor that generates an output used to detect a position of a magnetic pole of a rotor of the rotating electrical machine; and a controller that controls the power conversion unit on the basis of the output of the magnetic pole position sensor. The controller includes a phase difference correction unit that calculates a phase difference between an inductive voltage of the armature winding of the rotating electrical machine and a detection phase based on the output of the magnetic pole position sensor, and the phase difference correction unit corrects the detection phase on the basis of the phase difference detected by the phase difference detection unit and generates an output of the corrected phase difference. The controller controls the power conversion unit on the basis of the output of the phase difference correction unit.

Also, a control apparatus of a rotating electrical machine according to a second aspect of the invention controls a rotating electrical machine configured so as to drive a drive wheel of a vehicle or to be driven by the drive wheel, and includes: a power conversion unit that performs power conversion between an outside DC power supply and an armature winding of the rotating electrical machine; a magnetic pole position sensor that generates an output used to detect a position of a magnetic pole of a rotor of the rotating electrical machine; and a controller that controls the power conversion unit on the basis of the output of the magnetic pole position sensor. The controller includes: a current control unit that controls a current flowing to the armature winding of the rotating electrical machine according to a d-axis current command value and a q-axis current command value; a phase difference detection unit that detects a phase difference between the position of the magnetic pole of the rotating electrical machine and a detection phase based on the output of the magnetic pole position sensor according to a d-axis voltage command value and a q-axis voltage command value for the rotating electrical machine when the d-axis current command value and the q-axis current command value are set to 0; and a phase difference correction unit that corrects the detection phase on the basis of the phase difference detected by the phase difference detection unit and generates an output of the corrected phase difference. The controller controls the power conversion unit on the basis of the output of the phase difference correction unit.

The control apparatus of a rotating electrical machine according to the first aspect of the invention includes: a power conversion unit that performs power conversion between an outside DC power supply and an armature winding of the rotating electrical machine; a magnetic pole position sensor that generates an output used to detect a position of a magnetic pole of a rotor of the rotating electrical machine; and a controller that controls the power conversion unit on the basis of the output of the magnetic pole position sensor. The controller includes a phase difference detection unit that detects a phase difference between an inductive voltage of the armature winding of the rotating electrical machine and a detection phase based on the output of the magnetic pole position sensor, and a phase difference correction unit that corrects the detection phase on the basis of the phase difference detected by the phase difference detection unit and generates an output of the corrected phase difference. Also, the controller is configured in such a manner so as to control the power conversion unit on the basis of the output of the phase difference correction unit. It is therefore unnecessary to preliminarily acquire information on a load torque of the rotating electrical machine and inertia. Hence, even when the control apparatus of a rotating electrical machine is applied to a vehicle in which a load varies, the control apparatus is capable of controlling the rotating electrical machine with accuracy.

Also, the control apparatus of a rotating electrical machine according to the second aspect of the invention includes: a power conversion unit that performs power conversion between an outside DC power supply and an armature winding of the rotating electrical machine; a magnetic pole position sensor that generates an output used to detect a position of a magnetic pole of a rotor of the rotating electrical machine; and a controller that controls the power conversion unit on the basis of the output of the magnetic pole position sensor. The controller includes: a current control unit that controls a current flowing to the armature winding of the rotating electrical machine according to a d-axis current command value and a q-axis current command value; a phase difference detection unit that detects a phase difference between the position of the magnetic pole of the rotating electrical machine and a detection phase based on the output of the magnetic pole position sensor according to a d-axis voltage command value and a q-axis voltage command value for the rotating electrical machine when the d-axis current command value and the q-axis current command value are set to 0; and a phase difference correction unit that corrects the detection phase on the basis of the phase difference detected by the phase difference detection unit and generates an output of the corrected phase difference. Also, the controller is configured in such a manner so as to control the power conversion unit on the basis of the output of the phase difference correction unit. It is therefore unnecessary to preliminarily acquire information on a load torque of the rotating electrical machine and inertia. Hence, even when the control apparatus of a rotating electrical machine is applied to a vehicle in which a load varies, the control apparatus is capable of controlling the rotating electrical machine with accuracy.

The foregoing and other objects features, aspects, and advantages of the present invention will become more apparent from the following detailed description of the present invention when taken conjunction with the accompanying drawings.

DESCRIPTION OF THE PREFERRED EMBODIMENTS

First Embodiment

Figure 1:
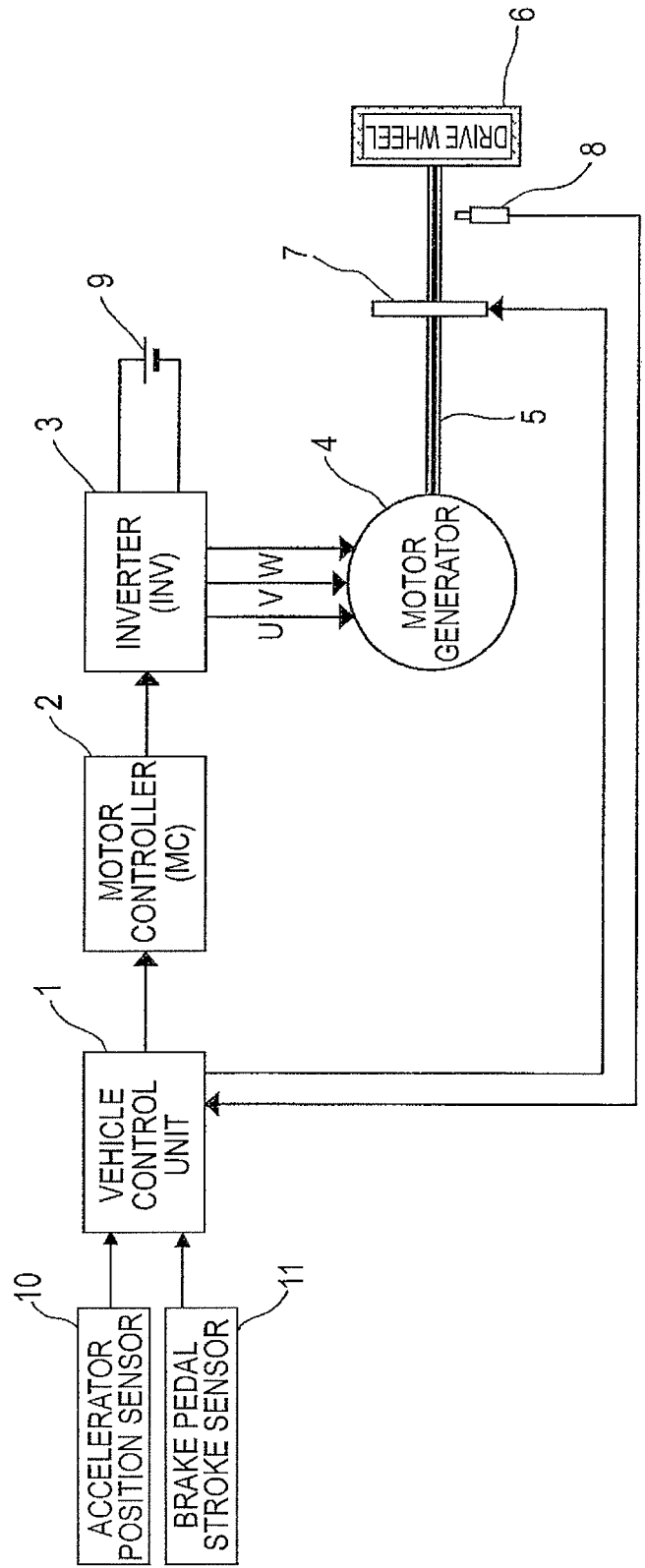
FIG. 1 is a view showing a configuration of a control apparatus of a rotating electrical machine according to a first embodiment of the invention.
Figure 2:
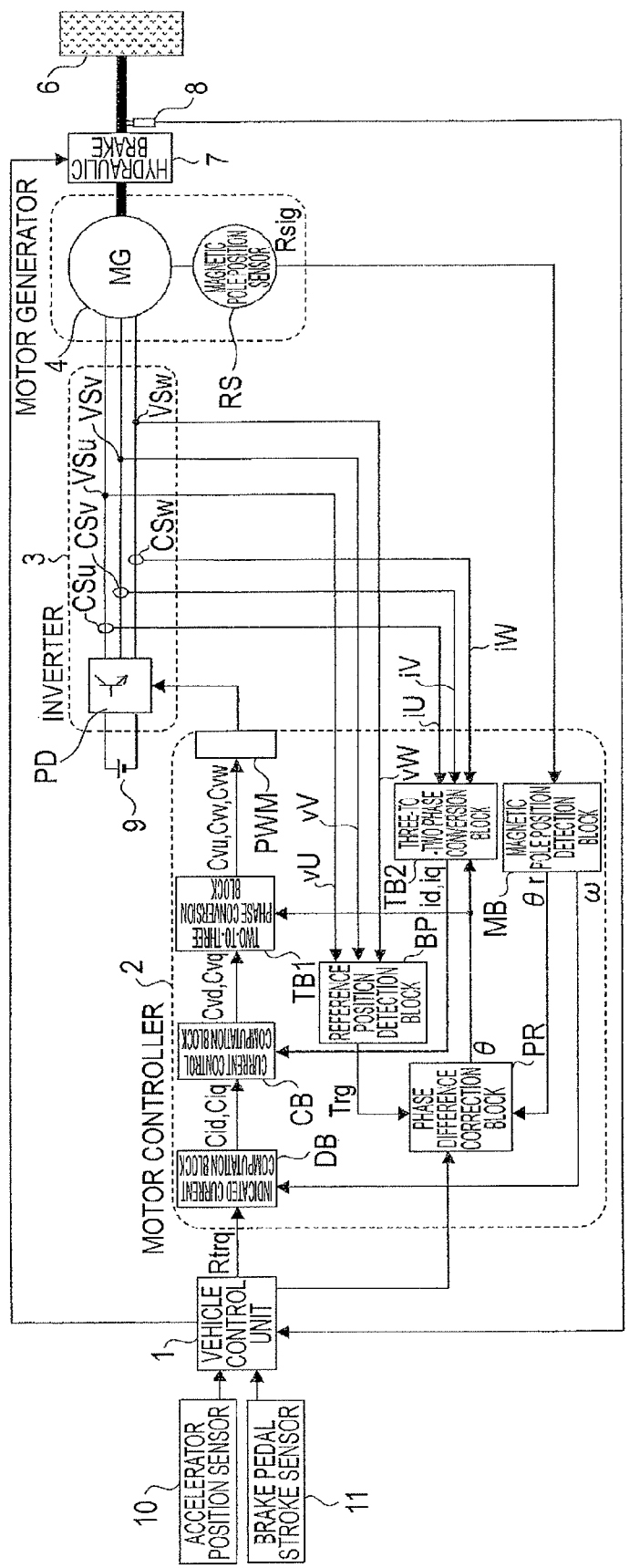
FIG. 2 is a block diagram of the control apparatus of a rotating electrical machine according to the first embodiment of the invention.

Hereinafter, a control apparatus of a rotating electrical machine according to a first embodiment of the invention will be described. FIG. 1 is a view showing a configuration of the control apparatus of a rotating electrical machine according to the first embodiment of the invention. FIG. 2 is a block diagram of the control apparatus of a rotating electrical machine according to the first embodiment of the invention. Referring to FIG. 1 and FIG. 2, a motor generator 4 as a rotating electrical machine installed to a vehicle, such as an electric car, is connected to a drive wheel 6 of the vehicle via a drive shaft 5 and thereby drives the vehicle. A hydraulic brake 7 is attached to the drive shaft 5. The motor generator 4 is a three-phase synchronous motor and also furnished with a function of performing regenerative power generation when driven by an engine or the drive wheel 6 as a load. The control apparatus controls the motor generator 4 by selecting either one of the two functions of the motor generator 4: a function as an electric motor and a function as a power generator.

A vehicle control unit 1 receives, as inputs, vehicle information signals, such as a vehicle speed signal detected by a vehicle speed sensor 8, a brake signal indicating a brake operation state of the vehicle detected by a brake pedal stroke sensor 11, an accelerator signal indicating an amount of operation of an accelerator pedal detected by an accelerator position sensor 10. The vehicle control unit 1 outputs a torque command value Rtrq on the basis of these vehicle information signals inputted therein.

A motor controller 2 as a controller controls an inverter 3 as a power conversion device according to the torque command value Rtrq from the vehicle control unit 1. The inverter 3 is controlled according to the torque command value Rtrq from the vehicle control unit 1 and converts DC power of an in-vehicle battery 9 as an outside DC power supply to AC power and supplies the AC power to the motor generator 4 or converts AC power generated in an armature winding of the motor generator 4 to DC power and supplies the DC power to the in-vehicle battery 9. When the motor generator 4 operates as an electric motor, the motor generator 4 is controlled by the inverter 3 as a power conversion unit so as to generate a torque corresponding to the torque command value Rtrq.

As is shown in FIG. 2, the motor controller 2 includes an indicated current computation block DB, a current control computation block CB, a two-to-three phase conversion block TB1, a phase difference correction block PR, a reference phase detection block BP, a three-to-two phase conversion block TB2, a magnetic pole position detection block MB, and a PWM control block PWM. In the first embodiment of the invention, the reference phase detection block BP forms a phase difference detection unit.

The indicated current computation block DB computes a d-axis current command value Cid and a q-axis current command value Ciq of a two-phase DC according to a map in which a relation between the torque command value Rtrq from the vehicle control unit 1 and an electric angular frequency $\omega$ of the motor generator 4 is set, and outputs the computation result. The current control computation block CB computes a d-axis voltage command value Cvd and a q-axis voltage command value Cvq so that there is a deviation of 0 between the d-axis current command value Cid and the q-axis current command value Ciq computed in the indicated current computation block DB and actual d-axis current value id and q-axis current value iq flowing to the armature winding of the motor generator 4, and outputs the computation result.

The two-to-three phase conversion block TB1 converts the d-axis voltage command value Cvd and the q-axis voltage command value Cvq of the two-phase DC from the current control computation block CB described above to three-phase AC voltage command values Cvu, Cvv, and Cvw on the basis of a position of a magnetic pole, $\theta$, of the motor generator 4 described below, and outputs the conversion result. The PWM control block PWM generates a PWM control signal according to the three-phase AC voltage command values Cvu, Cvv, and Cvw inputted therein from the two-to-three phase conversion block TB1 and outputs the PWM control signal. A plurality of switching elements forming a power conversion portion PD of the inverter 3 are controlled by PWM according to the PWM control signal from the PWM control block PWM so that the motor generator 4 generates a three-phase AC voltage corresponding to the three-phase AC voltage command values Cvu, Cvv, and Cvw.

The reference position detection block BP detects a zero cross point at which an inductive voltage of the motor generator 4 changes from a minus side to a plus side on the basis of three-phase AC voltages vU, vV, and vW of the inverter 3 detected by voltage sensors VSu, VSv, and VSw, respectively, and outputs the zero cross point as a reference position Trg. The magnetic pole position detection block MB outputs a detection phase $\theta r$ described below and based on a magnetic pole position signal Rsig from a magnetic pole position sensor RS described below and detecting a position of the magnetic pole of the motor generator 4, and the electric angular frequency $\omega$ of the motor generator 4.

The phase difference correction block PR calculates a phase difference $\theta e$ between an inductive voltage of the motor generator 4 and a detection phase $\theta r$ based on the magnetic pole position signal Rsig of the magnetic pole position sensor RS on the basis of the detection phase $\theta r$ from the magnetic pole position detection block MB and the reference position Trg from the reference position detection block BP. According to the phase difference $\theta e$ thus calculated, the phase difference correction block PR corrects the detection phase $\theta r$ based on the magnetic pole position signal Rsig of the magnetic pole position sensor RS described above, and outputs the corrected value as the position of the magnetic pole, $\theta$. The three-to-two phase conversion block TB2 converts three-phase AC currents iU, iV, and iW of the inverter 3 detected by current sensors CSu, CSv, and CSw, respectively, to a d-axis actual current id and a q-axis actual current iq of a two-phase DC on the basis of the corrected position of the magnetic pole, $\theta$, described above and provides the conversion result to the current control computation block CB.

The motor generator 4 is provided with the magnetic pole position sensor RS. The magnetic pole position sensor RS is formed, for example, of a synchro resolver and includes a rotor magnetic pole fixed to a rotor shaft of the motor generator 4 that is a synchronous machine and a stator having a stator winding in which an AC voltage is induced by rotations of the rotor magnetic pole. Normally, a rotor magnetic pole of the synchro resolver is fixed to the rotor shaft at a position coinciding with an installation position (installation angle about the shaft center) with respect to the shaft center of the rotor magnetic pole of the motor generator 4. Hence, an AC voltage corresponding to the installation position with respect to the shaft center of the magnetic pole of the motor generator 4 is induced in the armature winding of the synchro resolver. Accordingly, the magnetic pole position signal Rsig described above to be outputted from the armature winding of the synchro resolver contains information on the position of the magnetic pole of the motor generator 4.

In the control apparatus of a synchronous machine according to the first embodiment of the invention configured as above, the vehicle control unit 1 first computes the torque command value Rtrq on the basis of the vehicle information signals, such as a vehicle speed signal detected by the vehicle speed sensor 8, a brake signal indicating a brake operation state of the vehicle detected by the brake pedal stroke sensor 11, an accelerator signal indicating an amount of operation of the accelerator pedal detected by the accelerator position sensor 10. The vehicle control unit 1 then outputs the torque command value Rtrq thus computed to the motor controller 2 as a request torque for the motor generator 4.

The indicated current computation block DB in the motor controller 2 computes the d-axis current command value Cid and the q-axis current command value Ciq of the two-phase DC according to the map described above on the basis of the torque command value Rtrq inputted therein from the vehicle control unit 1 and the electric angular frequency $\omega$ of the motor generator 4 described above and inputted therein from the magnetic pole position detection block MB, and outputs the computation result to the current control computation block CB.

The current control computation block CB computes the d-axis voltage command value Cvd and the q-axis voltage command value Cvq of the two-phase DC so that there is a deviation of 0 between the d-axis current command value Cid and the q-axis current command value Ciq from the indicated current computation block DB and the d-axis actual current value id and the q-axis actual current value iq from the three-to-two phase conversion block TB2, and provides the computation result to the two-to-three phase conversion block TB1.

Meanwhile, the phase difference correction block PR calculates a phase difference $\theta e$ between the detection phase $\theta r$ based on the output signal Rsig of the magnetic pole position sensor RS and an inductive voltage of the motor generator 4 on the basis of the detection phase $\theta r$ from the magnetic pole position detection block MB and the reference position Trg from the reference position detection block BP, and corrects the detection phase $\theta r$ detected by the magnetic pole position sensor RS according to the phase difference θe thus calculated and outputs the corrected position of the magnetic pole, θ.

The two-to-three phase conversion block TB1 converts the d-axis voltage command value Cvd and the q-axis voltage command value Cvq of the two-phase DC to the three-phase AC voltage command values Cvu, Cvv, and Cvw on the basis of the position of the magnetic pole, θ, from the phase difference correction block PR. The PWM control block PWM generates a PWM control signal according to the three-phase AC voltage command values Cvu, Cvv, and Cvw and provides the PWM control signal to the power conversion portion PD of the inverter 3 to control the switching elements to switch ON or OFF. Accordingly, the PWM control block PWM controls the inverter 3 by PWM so that the three-phase output voltage values vU, vV, and vW of the inverter 3 coincide with the three-phase AC voltage command values Cvu, Cvv, and Cvw, respectively.

FIG. 3A through FIG. 3C are timing charts showing operation switching between a regeneration brake and a hydraulic brake and operations of a brake system used in the vehicle are shown by time charts. FIG. 3A shows a vehicle speed, FIG. 3B shows a stroke (amount of depressing) of the brake pedal, and FIG. 3C shows an operation ratio between the regeneration brake and the hydraulic brake.

More specifically, referring to FIGS. 3A through 3C, deceleration is started first at a time t1 by depressing of the brake pedal. At the start of deceleration, the regeneration brake indicated by a broken line is operated to recover energy. Subsequently, between a time t2 and a time t3, the regeneration brake is switched to the hydraulic brake indicated by a solid line when the vehicle speed drops near a vehicle stopping speed by declaration of the vehicle so that the feeling is matched to a stopping behavior of a vehicle equipped with a brake system having a hydraulic brake alone. After the time t3, the hydraulic brake alone operates. Although it is not shown in the drawing, switching between the regeneration brake and the hydraulic brake takes place according to an instruction from the vehicle control unit 1.

Figure 4:
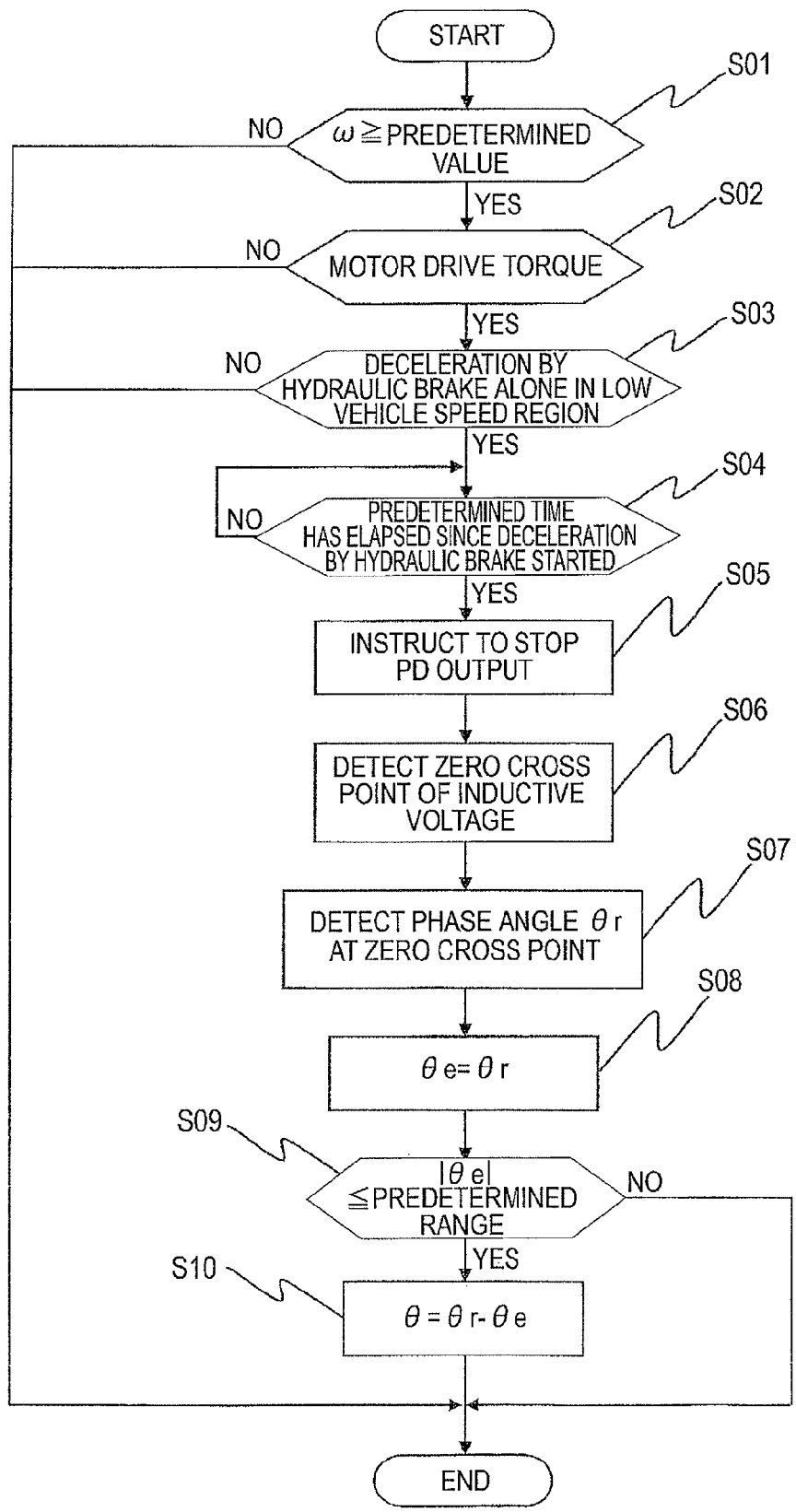
FIG. 4 is a flowchart depicting an operation of the control apparatus of a rotating electrical machine according to the first embodiment of the invention.

An operation of the control apparatus of a rotating electrical machine according to the first embodiment of the invention will now be described. FIG. 4 is a flowchart depicting an operation of the control apparatus of a synchronous machine according to the first embodiment of the invention. The flowchart of FIG. 4 is performed repetitively at regular intervals, for example, every 10 [ms].

Referring to FIG. 4, in Step S01, whether the electric angular frequency ω of the motor generator 4 detected in the magnetic pole position detection block MB is equal to or greater than a predetermined value is determined. When the electric angular frequency ω is equal to or greater than the predetermined value, it is determined that the magnetic pole position signal Rsig can be detected because the motor generator 4 is rotating and the flow proceeds to Step S02. When the electric angular frequency ω is less than the predetermined value, it is determined that detection accuracy of a position of the magnetic pole cannot be secured and the processing is ended.

In Step S02, whether a drive torque of the motor generator 4 is 0 [Nm] is determined to determine whether the motor generator 4 is in a coasting deceleration condition. When the drive torque of the motor generator 4 is 0 [Nm], the flow proceeds to Step S03 and the processing is ended when the drive torque is not 0 [Nm].

In Step S03, whether deceleration of the vehicle is deceleration by the hydraulic brake in a low vehicle speed region is determined. When the deceleration is deceleration by the hydraulic brake alone in the low vehicle speed region, the flow proceeds to Step S04. Otherwise, the processing is ended. By performing the processing during deceleration by the hydraulic brake in the low vehicle speed region, it becomes possible to detect a position of the magnetic pole without giving an unnatural feeling to the driver.

In Step S04, whether a predetermined time has elapsed since deceleration by the hydraulic brake started is determined. When the predetermined time has elapsed, the flow proceeds to Step S05. When the predetermined time has not elapsed, the flow waits for the predetermined time to elapse. By configuring in this manner, it becomes possible to eliminate influences of deceleration by the regeneration brake.

In Step S05, all the switching elements of the power conversion block PD of the inverter 3 are switched OFF. By switching OFF the switching elements of the power conversion block PD, the drive torque of the motor generator 4 is reduced to 0 [Nm]. It thus becomes possible to detect a phase of the rotor by an inductive voltage of the motor generator 4.

In Step S06, the inductive voltages uU, uV, and uW generated by rotations of the motor generator 4 are measured to detect a zero cross point at which the inductive voltages change from the plus side to the minus side as the reference position Trg (0 [deg]).

In Step S07, while the reference position Trg of the motor generator 4 is detected, an angle of the phase detected by the magnetic pole position sensor RS is detected as the detection phase θr on the basis of the detection signal Rsig of the magnetic pole position sensor RS. In this manner, by Steps S06 and S07, it becomes possible to synchronize detection timing of the position of the magnetic pole of the rotor of the motor generator 4 and detection timing of the detection phase θr detected by the magnetic pole position sensor RS. Consequently, it becomes possible to eliminate an error caused by displacement between measurement timings.

In Step S08, the detection phase θr based on an output of the magnetic pole position sensor RS detected at the reference position Trg is stored as the phase difference θe.

In Step S09, whether the phase difference θe calculated in Step S08 is within a predetermined range is determined. When the phase difference θe is within the predetermined range, the flow proceeds to Step S10. When the phase difference θe exceeds the predetermined value, the processing is ended without updating the phase difference θe at the magnetic pole position sensor RS. By configuring in this manner, it becomes possible to achieve an advantage that it becomes possible to suppress an erroneous detection of the phase difference caused by mixing of noises into the detection angle.

In Step S10, a value found by subtracting the phase difference θe from the detection phase θr detected by the magnetic pole position sensor RS is given as the position of the magnetic pole, θ, of the motor generator 4, and the processing is ended.

Figure 5:
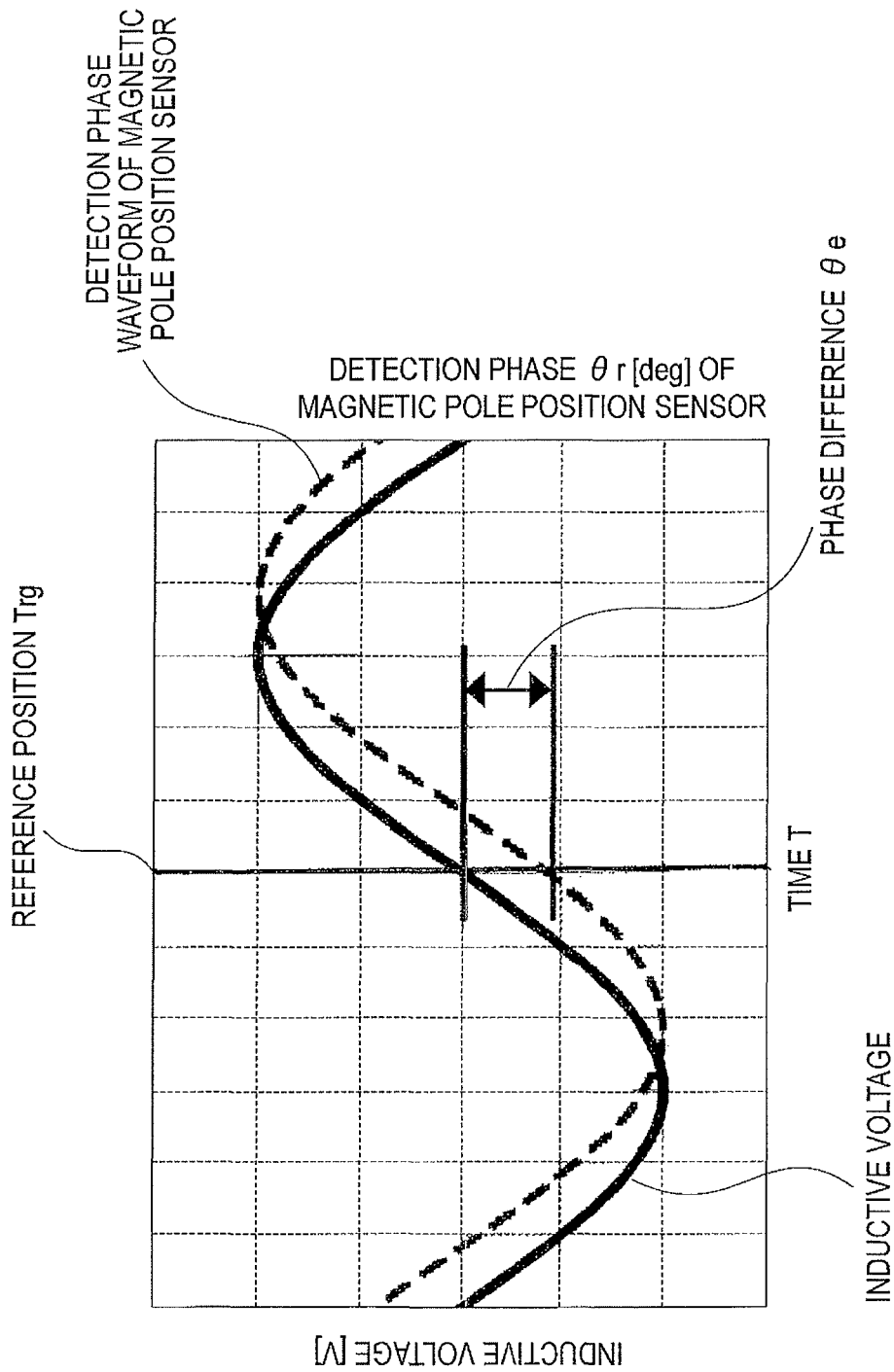
FIG. 5 is a view used to describe an operation of the control apparatus of a rotating electrical machine according to the first embodiment of the invention.

FIG. 5 is a view used to describe an operation of the control apparatus of a rotating electrical machine according to the first embodiment of the invention, and more specifically, it is a view used to describe a processing content in Steps S06 through S08 described above. As is shown in FIG. 5, by detecting the phase difference θe between the inductive voltage and the detection phase θr based on the output signal Rsig of the magnetic pole position sensor RS at the zero cross point (time T) of the inductive voltage when all the switching elements of the power conversion block PD of the inverter 3 are switched OFF during deceleration by the hydraulic brake in the low vehicle speed range, it becomes possible to detect the phase difference θe with accuracy without having to newly set a special operation mode and giving influences to drivability. Hence, even when the control apparatus of a rotating electrical machine of the first embodiment is applied to a vehicle in which a load varies, the control apparatus is capable of controlling the rotating electrical machine with accuracy.

Second Embodiment

Figure 6:
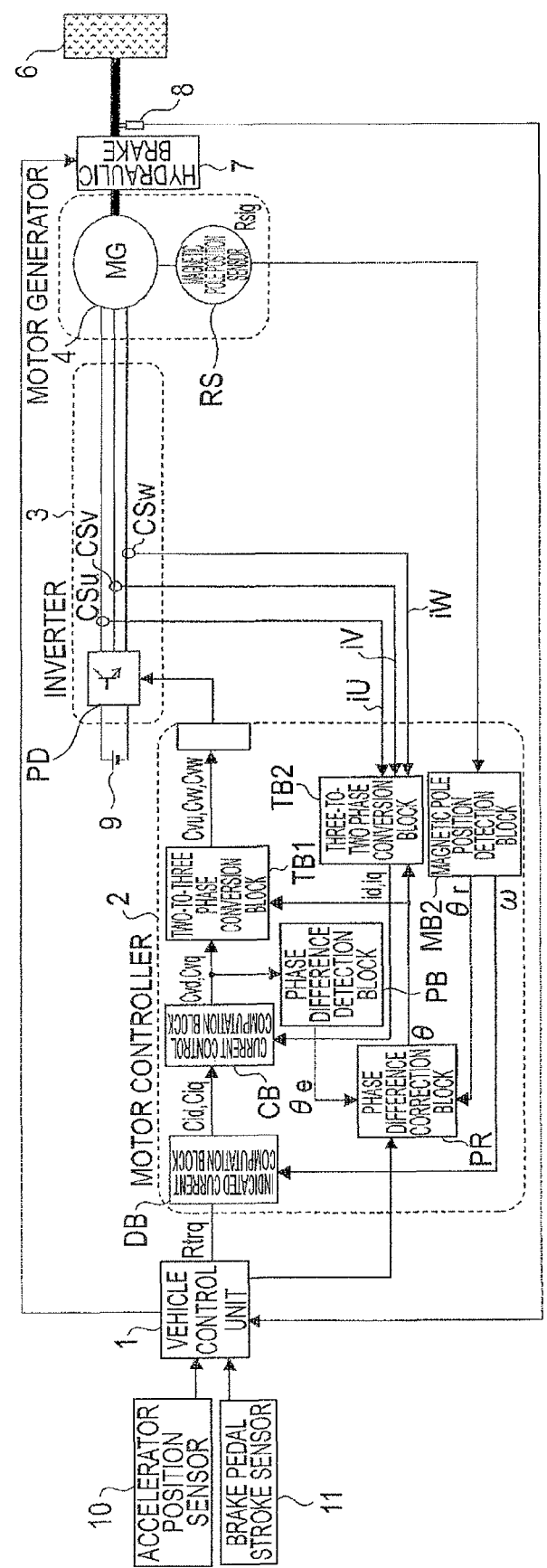
FIG. 6 is a block diagram of a control apparatus of a rotating electrical machine according to a second embodiment of the invention.

A control apparatus of a rotating electrical machine according to a second embodiment of the invention will now be described. FIG. 6 is a block diagram of the control apparatus of a rotating electrical machine according to the second embodiment of the invention. In FIG. 6, blocks operating in the same manner as the control blocks of the first embodiment above shown in FIG. 2 are labeled with the same block names and a difference from the first embodiment above will be chiefly described in the following.

Referring to FIG. 6, a phase difference detection block PB as a phase difference detection unit detects a phase difference θe between a voltage across the motor generator 4 and the detection phase θr based on an output of the magnetic pole position sensor RS according to the d-axis voltage command value Cvd and the q-axis voltage command value Cvq of a two-phase DC calculated in the current control computation block CB.

Herein, a detection method of the phase difference θe according to the d-axis voltage command value Cvd and the q-axis voltage command value Cvq will be described. A voltage equation of the motor generator 4 in the d-axis coordinate and the q-axis coordinate is given by Equation (1) as follows:

$$\begin{bmatrix} Cvd \\ Cvq \end{bmatrix} = \begin{bmatrix} R & -\omega Lq \\ \omega Ld & R \end{bmatrix} \begin{bmatrix} Cid \\ Ciq \end{bmatrix} + \begin{bmatrix} 0 \\ \omega \Phi \end{bmatrix} \quad (1)$$

where Cvd is a d-axis voltage command value, Cvq is a q-axis voltage command value, R is winding resistance across the motor generator 4, Ld is d-axis inductance, Lq is q-axis inductance, ω is an electric angular rotating speed of the motor generator 4, Cid is a d-axis current command value, Ciq is a q-axis current command value, and Φ is a magnetic flux of the motor generator 4.

Assume that there is no phase difference between the position of the magnetic pole of the motor generator 4 and the detection phase θr based on an output of the magnetic pole position sensor RS. Then, given that the d-axis current command value Cid and the q-axis current command value Ciq of the two-phase DC to the motor generator 4 are 0 [A], the drive torque is 0 [Nm]. Hence, the d-axis voltage command value Cvd and the q-axis voltage command value Cvq of a DC are expressed as Equation (2) below, and only an inductive voltage ωΦ determined by the rotating speed and the magnetic flux of the motor generator 4 is generated.

$$\begin{bmatrix} Cvd \\ Cvq \end{bmatrix} = \begin{bmatrix} 0 \\ \omega \Phi \end{bmatrix} \quad (2)$$

Figure 7B:
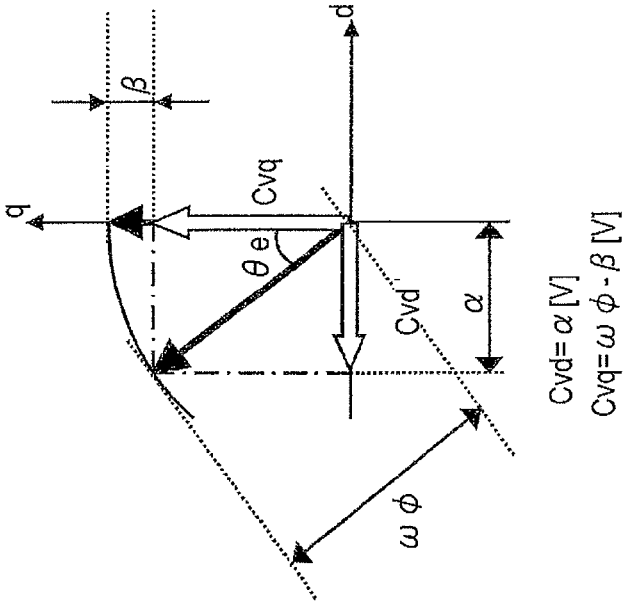
FIG. 7A and FIG. 7B are views used to describe an operation of the control apparatus of a rotating electrical machine according to the second embodiment of the invention.
Figure 7A:
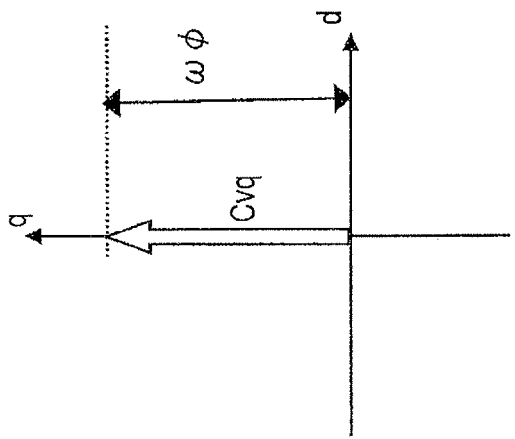

FIG. 7A is a view used to describe a case where there is no phase difference between the position of the magnetic pole of the motor generator 4 and the detection phase θr of the magnetic pole position sensor RS. In the drawing, the d-axis voltage command value Cvd is 0 and the q-axis voltage command value Cvq coincides with the inductive voltage ωΦ.

However, in a case where there is a phase difference θe between outputs of the motor generator 4 and the magnetic pole position sensor RS, the d-axis voltage command value Cvd and the q-axis voltage command value Cvq of a DC are expressed by Equation (3) as follows:

$$\begin{bmatrix} Cvd \\ Cvq \end{bmatrix} = \begin{bmatrix} \alpha \\ \omega \Phi - \beta \end{bmatrix} \quad (3)$$

where α is a d-axis voltage value to set the d-axis current command value Cid and the q-axis current command value Ciq at the occurrence of the phase difference θe to 0 [A], β is a difference between the q-axis voltage command value Cvq to set the d-axis current command value Cid and the q-axis current command value Ciq at the occurrence of the phase difference θe to 0 [A] and the q-axis voltage command value Cvq (=ωΦ) when there is no phase difference θe. FIG. 7B is a view used to describe a case where there is the phase difference θe between the position of the magnetic pole of the motor generator 4 and the detection phase θr of the magnetic pole position sensor RS. Herein, Cvd=α [V] and Cvq=ωΦ=β are given.

A relation among the phase difference θe, the d-axis coordinate voltage value, and the q-axis coordinate voltage value is expressed by Equation (4) as follows.

$$\tan \theta e = \left( \frac{\alpha}{\omega \Phi - \beta} \right) \quad (4)$$

Hence, the phase difference θe based on the position of the magnetic pole of the motor generator 4 and an output of the magnetic pole position sensor RS can be expressed as Equation (5) below using the d-axis voltage command value Cvd and the q-axis voltage command value Cvq of a DC.

$$\theta e = \tan^{-1} \left( \frac{Cvd}{Cvq} \right) \quad (5)$$

More specifically, the phase difference θe between the position of the magnetic pole of the motor generator 4 and an output of the magnetic pole position sensor RS is found by the d-axis voltage command value Cvd and the q-axis voltage command value Cvq of a two-phase DC when the d-axis current command value Cid and the q-axis current command value Ciq to set the drive torque of the motor generator 4 to 0 [Nm] are set to 0 [A].

Figure 3:
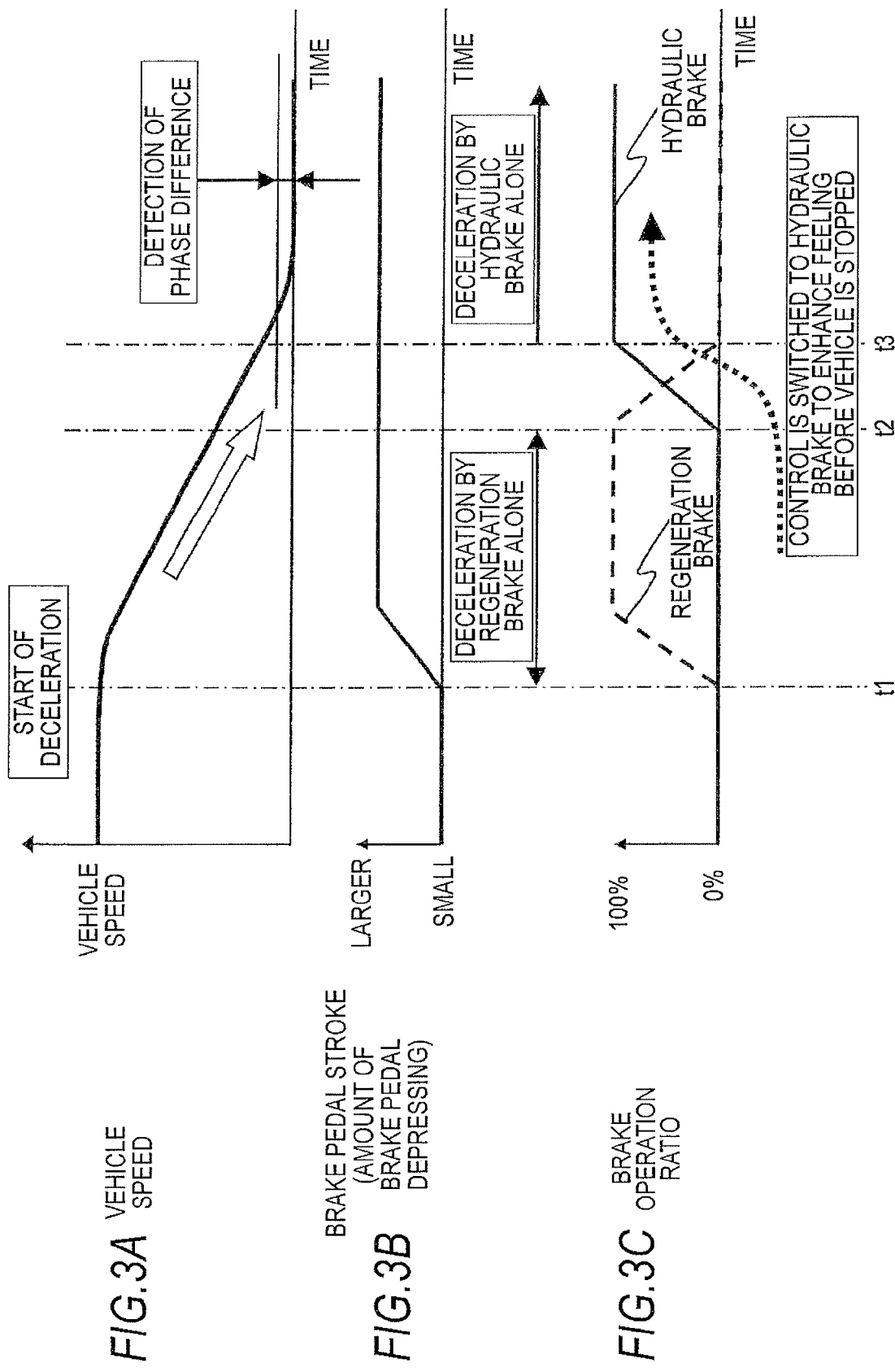
FIG. 3A through FIG. 3C are timing charts showing operation switching between a regeneration brake and a hydraulic brake.
Figure 8:
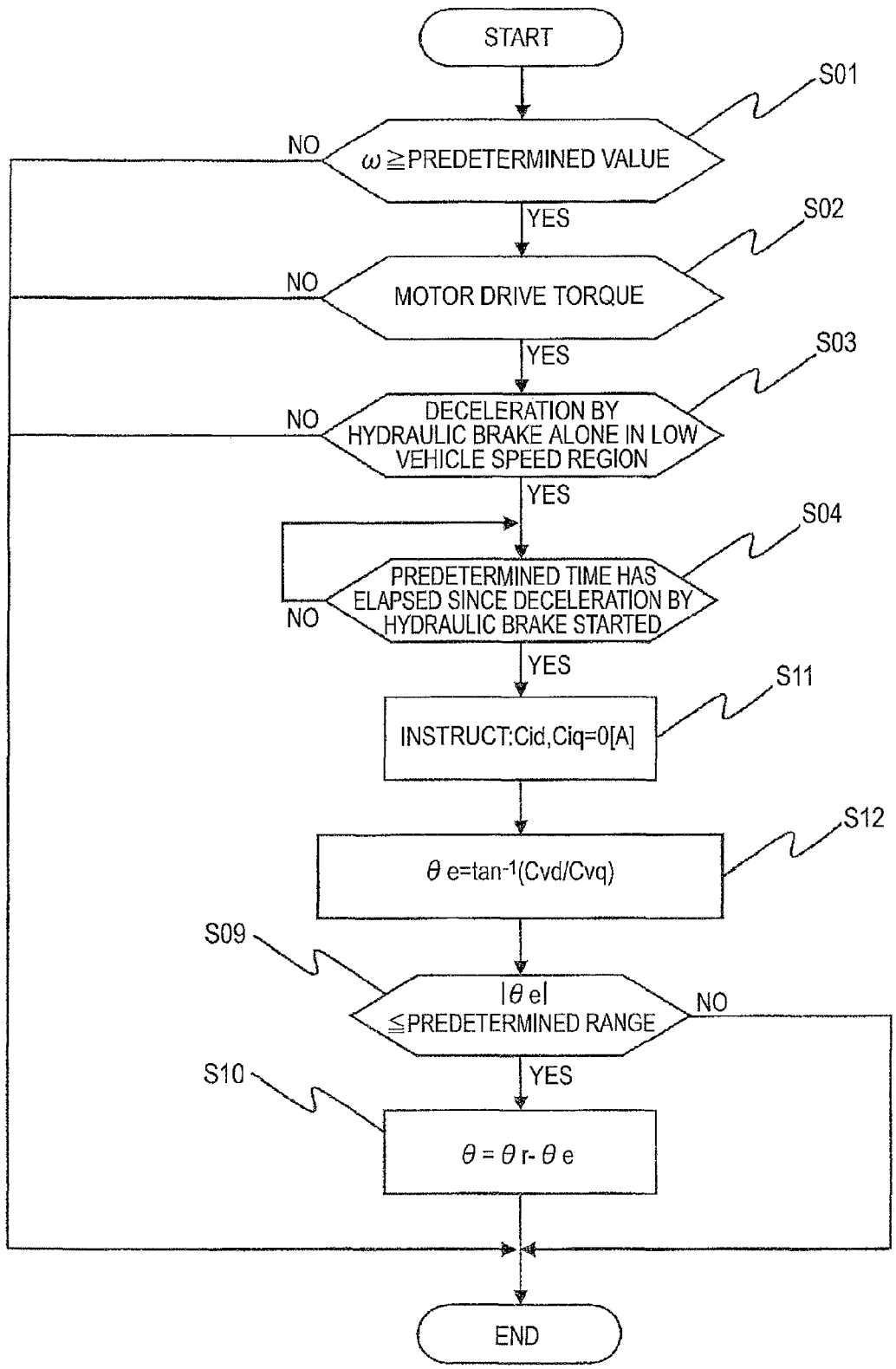
FIG. 8 is a flowchart depicting an operation of the control apparatus of a rotating electrical machine according to the second embodiment of the invention.

FIG. 8 is a flowchart depicting an operation of the control apparatus of a rotating electrical machine according to the second embodiment of the invention. Steps in which the same operations are performed as those in the first embodiment above shown in FIG. 3 are labeled with the same step numbers and a difference from the first embodiment above will be chiefly described in the following.

Referring to FIG. 8, in Step S11, the d-axis current command value Cid and the q-axis current command value Ciq are set to 0 [A] so that a drive torque of the motor generator 4 becomes 0 [Nm]

Subsequently, in Step S12, the d-axis voltage command value Cvd and the q-axis voltage command value Cvq of the two-phase DC when the d-axis current command value Cid and the q-axis current command value Ciq of the two-phase DC are set to 0 [A] are substituted into Equation (5) above [θe=tan⁻¹ (Cvd/Cvq)] to obtain the phase difference θe.

In this manner, according to the second embodiment of the invention, it becomes possible to find the phase difference θe at the magnetic pole position sensor RS from the d-axis voltage command value Cvd and the q-axis voltage command value Cvq of the two-phase DC when the d-axis current command value Cid and the q-axis current command value Ciq are set to 0 [A]. Hence, because voltage sensors that detect a three-phase AC voltage across the motor generator 4 become unnecessary, the phase difference θe can be detected at low costs. Moreover, even when the control apparatus of a rotating electrical machine of the second embodiment is applied to a vehicle in which the load varies, the control apparatus is capable of controlling the rotating electrical machine with accuracy.

The first and second embodiments above have described an electric car using the three-phase synchronous machine as a drive force of the vehicle. It should be noted, however, that the invention is not limited to an electric car, such as a hybrid electric car, and the advantage described above can be achieved in other applications.

Various modifications and alterations of this invention will be apparent to those skilled in the art without departing from the scope and spirit of this invention, and it should be understood that this is not limited to the illustrative embodiments set forth herein.

What is claimed is:

1. A control apparatus of a rotating electrical machine controlling a rotating electrical machine configured in one of manners so as to drive a drive wheel of a vehicle and to be driven by the drive wheel, comprising:
a power conversion unit that performs power conversion between an outside DC power supply and an armature winding of the rotating electrical machine;
a magnetic pole position sensor that generates an output used to detect a position of a magnetic pole of a rotor of the rotating electrical machine; and
a controller that controls the power conversion unit on the basis of the output of the magnetic pole position sensor, wherein:
the controller includes, a phase difference correction unit that calculates phase difference between an inductive voltage of the armature winding of the rotating electrical machine and a detection phase based on the output of the magnetic pole position sensor, and the phase difference correction unit corrects the detection phase on the basis of the calculated phase difference and generates an output of the corrected phase difference; and the controller controls the power conversion unit on the basis of the output of the phase difference correction unit,
wherein the vehicle is formed so that both of a mechanical brake and a regeneration brake by the rotating electrical machine are available; the controller suspends an operation of the power conversion unit in a case where the vehicle is decelerated by the mechanical brake alone; and the phase difference correction unit calculates the phase difference between the inductive voltage of the armature winding of the rotating electrical machine and the detection phase based on the output of the magnetic pole position sensor while the operation of the power conversion unit is suspended.

2. The control apparatus of a rotating electrical machine according to claim 1, further comprising: an inductive voltage detection unit that detects the inductive voltage of the rotating electrical machine, wherein the phase difference correction unit calculates the phase difference between the inductive voltage detected by the inductive voltage detection unit and the detection phase based on the output of the magnetic pole position sensor.

3. The control apparatus of a rotating electrical machine according to claim 1, further comprising: a stopping determination unit that determines whether it is immediately before the vehicle is stopped, wherein the phase difference correction unit calculates the phase difference when the stopping determination unit determines that it is immediately before the vehicle is stopped.

4. The control apparatus of a rotating electrical machine according to claim 1, wherein when the phase difference calculated by the phase difference correction unit is not within a predetermined range, the output of the magnetic pole position sensor is corrected on the basis of the phase difference detected last time.

5. A control apparatus of a rotating electrical machine controlling a rotating electrical machine configured in one of manners so as to drive a drive wheel of a vehicle and to be driven by the drive wheel, comprising:
a power conversion unit that performs power conversion between an outside DC power supply and an armature winding of the rotating electrical machine;
a magnetic pole position sensor that generates an output used to detect a position of a magnetic pole of a rotor of the rotating electrical machine; and
a controller that controls the power conversion unit on the basis of the output of the magnetic pole position sensor, wherein:
the controller includes,
a current control unit that controls a current flowing to the armature winding of the rotating electrical machine according to a d-axis current command value and a q-axis current command value,
a phase difference detection unit that detects a phase difference between the position of the magnetic pole of the rotating electrical machine and a detection phase based on the output of the magnetic pole position sensor according to a d-axis voltage command value and a q-axis voltage command value for the rotating electrical machine when the d-axis current command value and the q-axis current command value are set to 0, and a phase difference correction unit that corrects the detection phase on the basis of the phase difference detected by the phase difference detection unit and generates an output of the corrected phase difference; and the controller controls the power conversion unit on the basis of the output of the phase difference correction unit,
wherein the vehicle is formed so that both of a mechanical brake and a regeneration brake by the rotating electrical machine are available; and the phase difference detection unit detects the phase difference between the position of the magnetic pole of the motor generator and the output of the magnetic pole position sensor according to the d-axis voltage command value and the q-axis voltage command value when the d-axis current command value and the q-axis current command value are set to 0 in a case where the vehicle is decelerated by the mechanical brake alone.

6. The control apparatus of a rotating electrical machine according to claim 5, further comprising: a stopping determination unit that determines whether it is immediately before the vehicle is stopped, wherein the phase difference detection unit detects the phase difference when the stopping determination unit determines that it is immediately before the vehicle is stopped.

7. The control apparatus of a rotating electrical machine according to claim 5, wherein when the phase difference detected by the phase difference detection unit is not within a predetermined range, the output of the magnetic pole position sensor is corrected on the basis of the phase difference detected last time.

* * * * *